June 5, 1923.

G. A. LEIGHTON 1,457,441

SOLDERING MACHINE

Filed Dec. 6, 1920

INVENTOR
George A. Leighton
BY Munday
Clarke & Carpenter
ATTORNEYS

June 5, 1923.

G. A. LEIGHTON

SOLDERING MACHINE

Filed Dec. 6, 1920

INVENTOR
George A. Leighton
BY Munday, Clarke
& Carpenter
ATTORNEYS

June 5, 1923.

G. A. LEIGHTON

SOLDERING MACHINE

Filed Dec. 6, 1920

INVENTOR
George A. Leighton
BY Munday, Clarke
Carpenter
ATTORNEYS

June 5, 1923.

G. A. LEIGHTON

SOLDERING MACHINE

Filed Dec. 6, 1920

Patented June 5, 1923.  1,457,441

UNITED STATES PATENT OFFICE.

GEORGE A. LEIGHTON, OF ROSLINDALE, MASSACHUSETTS, ASSIGNOR TO AMERICAN CAN COMPANY, OF NEW YORK, N. Y., A CORPORATION OF NEW JERSEY.

SOLDERING MACHINE.

Application filed December 6, 1920. Serial No. 428,596.

*To all whom it may concern:*

Be it known that I, GEORGE A. LEIGHTON, a citizen of the United States, residing in Roslindale, in the county of Suffolk and State of Massachusetts, have invented a new and useful Improvement in Soldering Machines, of which the following is a specification.

This invention relates in general to soldering machines and has more particular reference to such machines for soldering the lips in sardine can covers and the like.

A principal object of the invention is the provision of a machine adapted to perform soldering and attendant operations formerly performed by hand and, generally, to overcome the difficulties incident to hand soldering.

A further object of the invention is the provision of a soldering machine which is automatic in its action, requires few attendants and eliminates many hand operators formerly required.

Another object of the invention is the provision of a machine of the type described which is adapted to position the lips to be soldered in the cover with uniform accuracy and to bend them to the exact shape desired.

Still another object of the invention is the provision of means in such a machine whereby flux and solder are fed in the exact quantities and proportions required, thus effecting a saving of much solder necessarily wasted in the hand operation referred to, and improving the appearance of the package by preventing discoloration from the use of an excess of flux.

A still further object of the invention is the provision of a machine of this type accomplishing these and other objects while at the same time being of comparatively simple construction and operation and having a minimum number of delicate or easily damaged parts.

Another and highly important object of the invention is the provision of means in a machine of the kind described whereby its action is arrested in case of a jam or failure to properly function.

Numerous other objects and advantages of the invention will be apparent as it is better understood from the following description when considered in connection with the accompanying drawings illustrating a preferred embodiment thereof.

Referring to the drawings.

On the drawings, which illustrate an embodiment of my invention, it will be noted that the machine is supported upon three pairs of legs 11, 12 and 13, which are connected and braced near the bottom by angle iron tie rails 14. At the top of these legs, and forming a support for the operating mechanisms of the machine, are two angle iron chain rails 15 and 16. A chain conveyor 17 slides between and on the top edge of these rails and over sprockets 18 and 19 between the upper ends of legs 11 and 13, the sprocket 18 being idle and mounted on a shaft 21, and the sprocket 19 being driven and mounted on a shaft 22.

Figure 1:
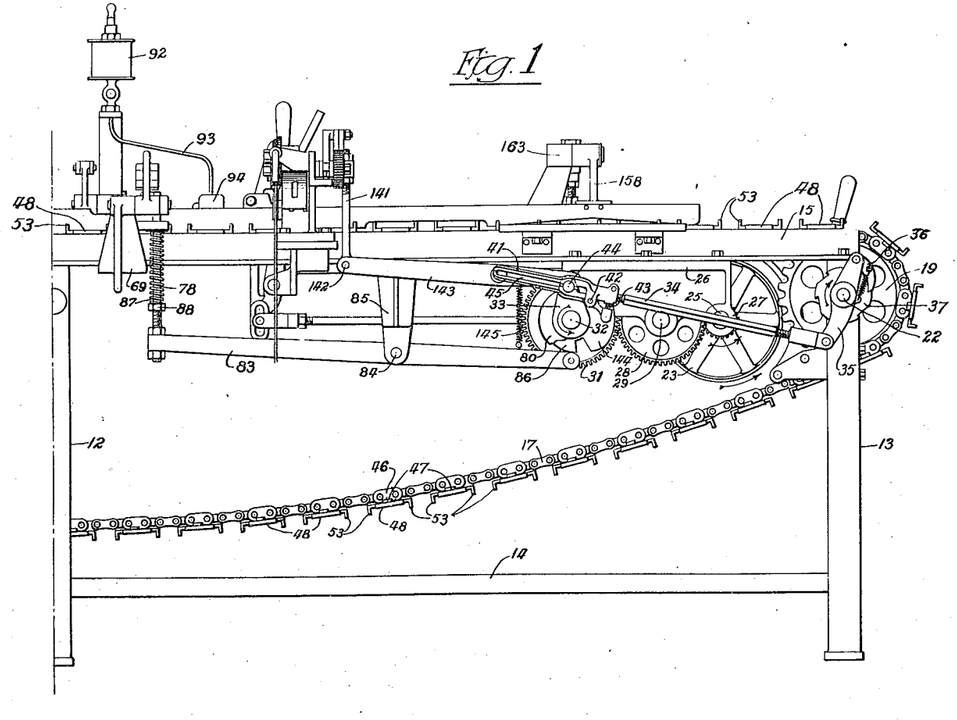
Figure 1 is a side elevation of the delivery end of the machine.
Figure 2:
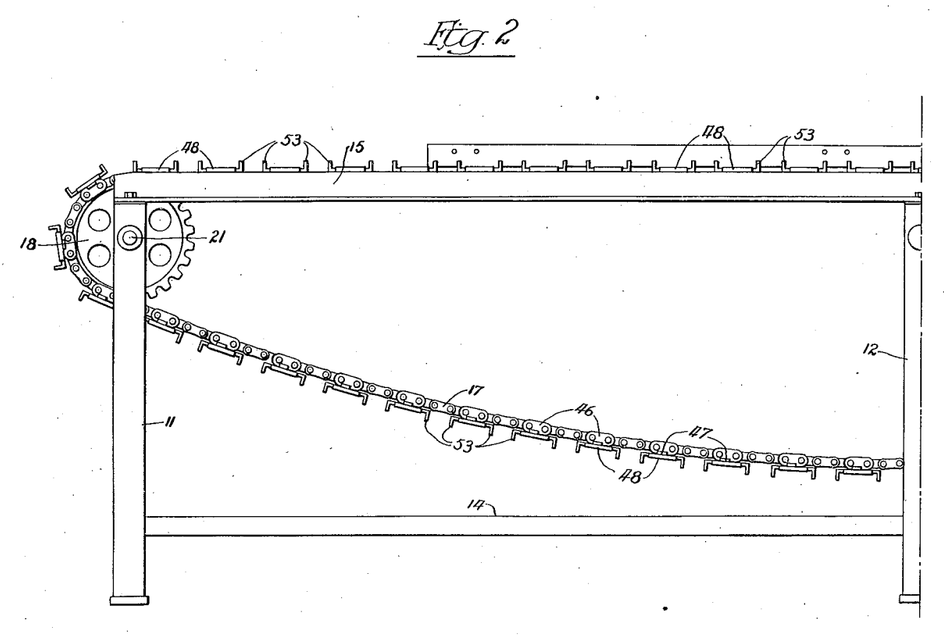
Fig. 2 is a side elevation of the receiving end of the machine, forming, with Figure 1, a complete side elevation of the entire machine.
Figure 3:
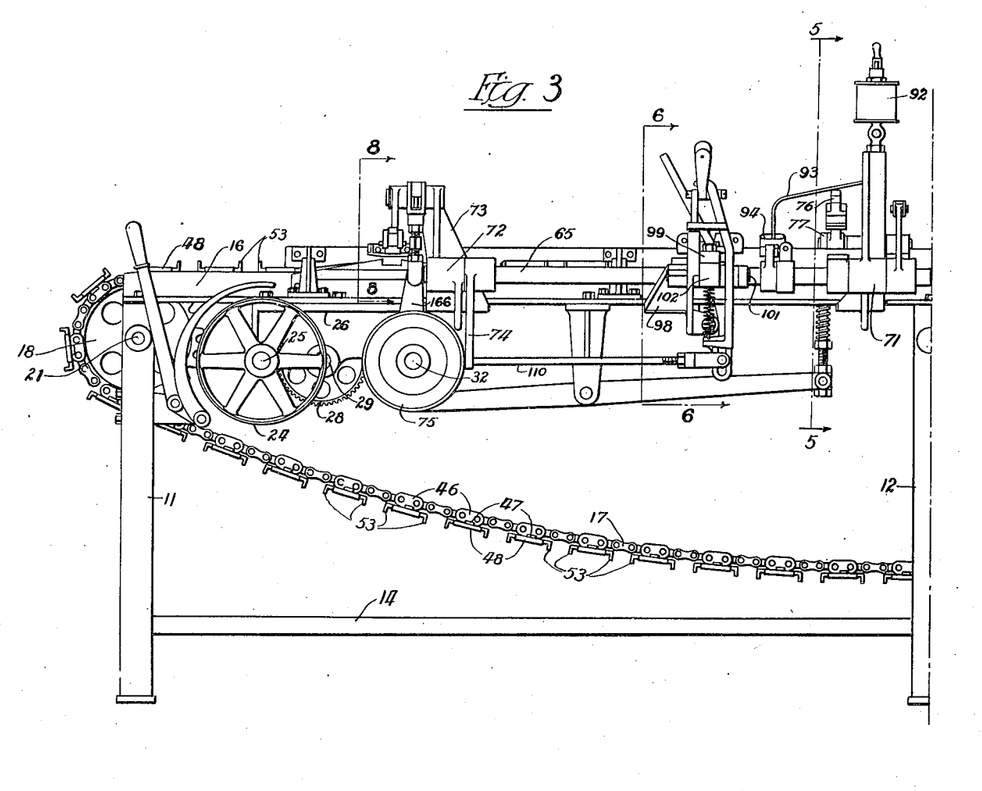
Fig. 3 is a side elevation of the delivery end of the machine viewed from the opposite side.
Figure 4:
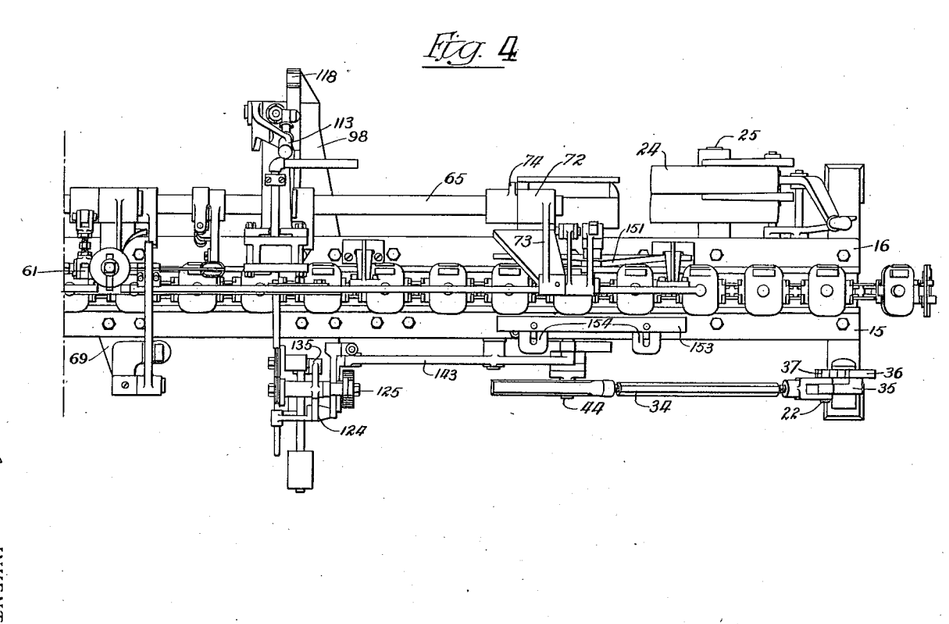
Fig. 4 is a top plan view of the delivery end of the machine.

The mechanism by which power is transmitted to the machine is shown in Figs. 3 and 4. Fast and loose pulleys 23 and 24 are mounted on a drive shaft 25 which has its bearings in a bracket 26 secured to the under side of rails 15 and 16. Upon the same shaft is a drive gear 27 (Fig. 1) which meshes with and drives an intermediate gear 28, which is secured upon a shaft 29, also mounted in the bracket 26. A gear 31 upon a shaft 32, mounted in the end of the bracket 26, is driven by the intermediate gear 28, said shaft 32 also carrying a crank 33 on its end. Movement of this crank imparts, through a connecting rod 34, a rocking motion to a pawl lever 35 loosely mounted on the shaft 22 and this, by means of a pawl 36 and a ratchet 37 fixed on said shaft, causes intermittent movement of the sprocket 19, thus advancing the chain conveyor 17.

I provide automatic means for stopping this action in case of a jam of the covers or other accident causing stoppage of the chain conveyor 17. The end of the connecting rod 34, which is attached to the crank 33, comprises a pair of jaws 41, the lower one of which pivots on a fulcrum pin 42 and is held in closed position by a spring 43. A crank pin 44 has its bearing between the jaws and, in the event mentioned, it will exert pressure against said bearing and will be forced by the rod 34 to enter a pin slot 45, the jaws having been opened by the pressure of the pin 44 and consequent compression, by the lower jaw, of the spring 43. In this manner the action of said rod is terminated and the machine saved from wreckage or damage.

Figure 9:
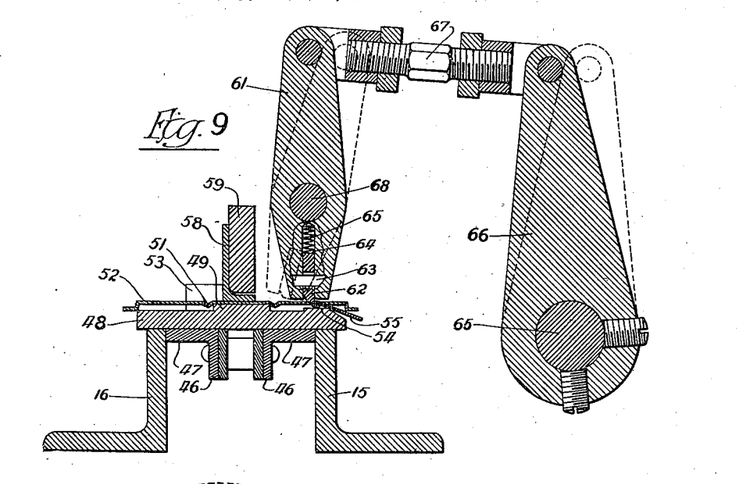
Fig. 9 is an enlarged section showing the completion of the act of positioning the lip in the cover.

The conveyor chain 17 is of the roller type and has alternate links 46 in which are outwardly extending lugs 47 to which are fastened cover carriers 48. On the upper surface of these carriers is a circular projection 49 adapted to engage within a bead 51 in the central part of the covers 52 (Fig. 9). This, with end lugs 53, holds the covers in place on the carriers. The carriers have an anvil part 54 immediately beneath the joint between the covers 52 and key lips 55. The covers 52, as may be seen in Fig. 14, have, near one end and at the point of a scored section 56, a slit 57 through which the lip 55 is inserted and brought approximately into position by hand. The covers are then placed between the lugs 53 on the chain conveyor 17 at the receiving end of the machine.

Movement of said conveyor brings the covers beneath a center guide 59 and they are held in position on the carriers under spring tension by a movable guide gib 58 slidably secured to said guide.

The first mechanical operation consists in accurately positioning the key lips 55, as may be readily seen in Fig. 9, dotted lines being used to show clearance positions. An assembling lever 61 has a contact plate 62 in its lower part, said plate being secured by retaining pins 63 and being movable within the limits of a slot 64, a spring 65 serving to keep it at its lowest point and in yielding contact with the cover 52 while it is positioning the lip 55. The desired movement is given to this lever 61 from a rocker shaft 65 through a lever 66 having an adjustable connection 67 with the upper part of said lever 61, the latter being fulcrumed on a stud 68 secured in a slot on an assembly bracket 69. The rocker shaft 65 has a bear-stud 68 secured in a slot on an assembler bracket and another bearing 72 at the other end in a folder bracket 73, and is operated by a cam lever 74 secured thereto, said lever being oscillated by a cam groove in a cam member 75 carried on the shaft 32. This accomplishes the movement of assembling lever 61, indicated in Fig. 9.

Figure 5:
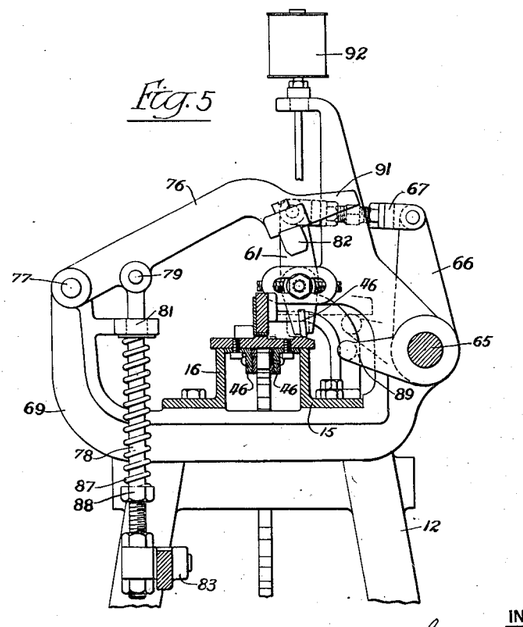
Fig. 5 is a sectional view taken substantially on the line 5—5 in Fig. 3.
Figure 10:
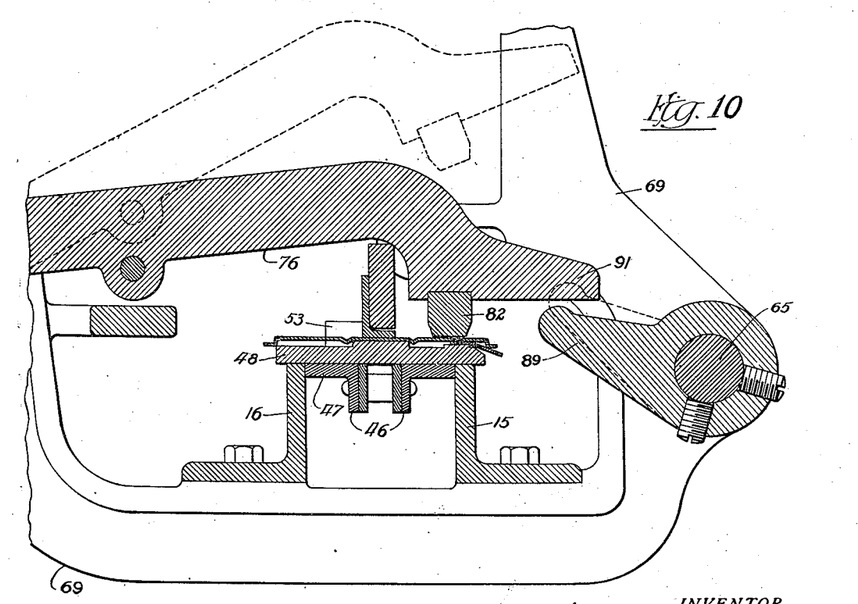
Fig. 10 is an enlarged section showing the hammer by which the cover and lip are flattened.

The next action is the flattening of the covers and lips together preparatory to soldering, and the means whereby this is done may be seen in Figs. 5 and 10. A hammer 76 is fulcrumed on a stud 77 in the bracket 69, which extends upwardly on either side of the chain rails 15 and 16. An operating connection 78 has a pivotal connection at 79 with the hammer 76 and is held in a bearing 81 protruding from the bracket 69. The hammer is normally held in raised position, as in Fig. 5 and as indicated by dotted lines in Fig. 10. It has a block portion 82 and is operated by a lever 83 fulcrumed at 84 in a bracket 85 depending from the chain rails 15 and 16. This lever has one end moved on a cam 86 integral with a cam member 80 on the shaft 32 and is actuated thereby, the other end being attached to the operating connection 78 which is moved upwardly by the lever to raise the hammer after a blow. A spring 87 is held on the connection 78, between a nut 88 and the bearing 81 and is thus compressed and, when pressure of the lever 83 is released, causes the hammer to strike a quick blow. Immediately thereafter the hammer is slightly raised to clear the cover by a lifter arm 89 which is carried on shaft 65 and contacts with an extension 91 at the free end of the hammer. The blows are repeated periodically as the covers are brought into position to receive them.

Figure 11:
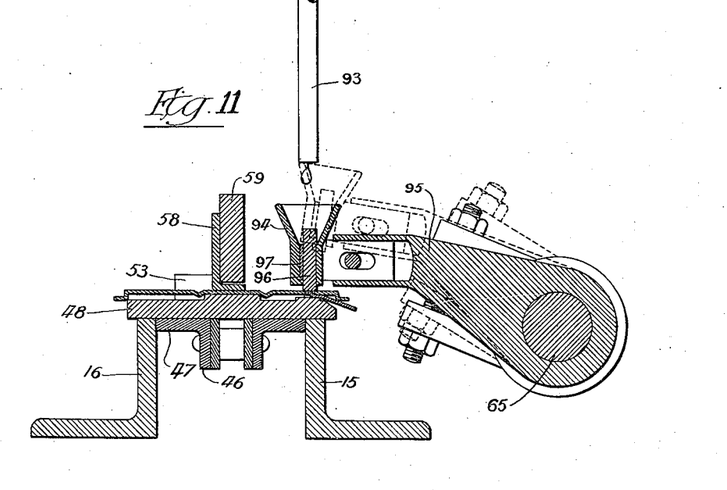
Fig. 11 is an enlarged section showing the means for feeding soldering flux.

The next operation is the deposit of soldering flux on the joint between the cover and the lip. A sight feed drip cup 92 is mounted at the highest point of the assembler bracket 69 and feeds flux, according to its adjustment, through a small tube 93 to a funnel 94 adjustably attached to an arm 95 carried on the shaft 65 (Fig. 11). Within this funnel is a piece of felt 96 held in place by a gib 97 and projecting beneath the funnel immediately over the cover and lip joint. This absorbs the flux as it is dropped from the tube 93 and acts as a sponge being slightly squeezed and depositing the desired amount of flux on said joint when the arm 95 is operated by the rocker shaft 65, it being raised in time to clear the cover before the next advancing movement of the conveyor.

Figure 12:
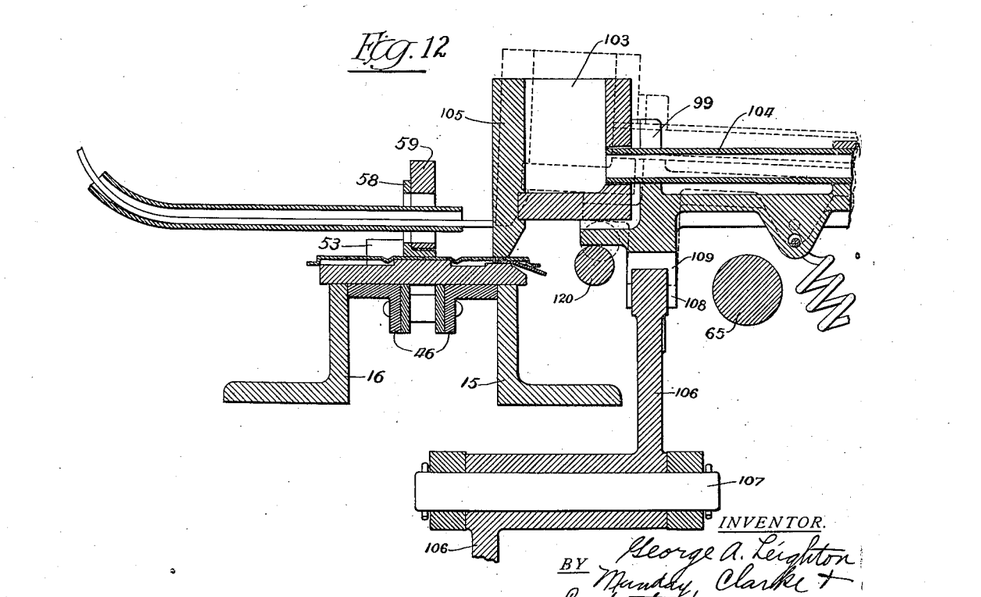
Fig. 12 is an enlarged section showing the soldering iron in operative position and the solder being applied thereto.

The means by which the solder is applied will now be described. A bracket 98 (Fig. 6) is attached to the under side of rails 15 and 16 and serves as a support for the soldering members. An arm 99 is fulcrumed on a stud 101, on which is also mounted a swivel 102 giving universal motion to said arm. A combustion chamber 103 (Fig. 12) is secured to the free end of the arm 99 and gas and air are fed thereto through a pipe 104 attached to said arm. A soldering iron 105 forms one wall of this chamber and is heated by an impinging flame therein. It contacts with the cover 52 at its joint with the lip 55 when the conveyor 17 is stationary and applies solder supplied in a manner to be presently described.

The arm 99 is oscillated horizontally within adjusted limits by a rocking lever 106 fulcrumed on a pin 107 and taking into a slot 108 in a projection 109 depending from said arm, said lever being operated by an adjustable connecting rod 110, one forked end of which straddles the shaft 32 and carries a cam roll which moves within a face cam groove cut in the gear 31.

Figures 6, 7:
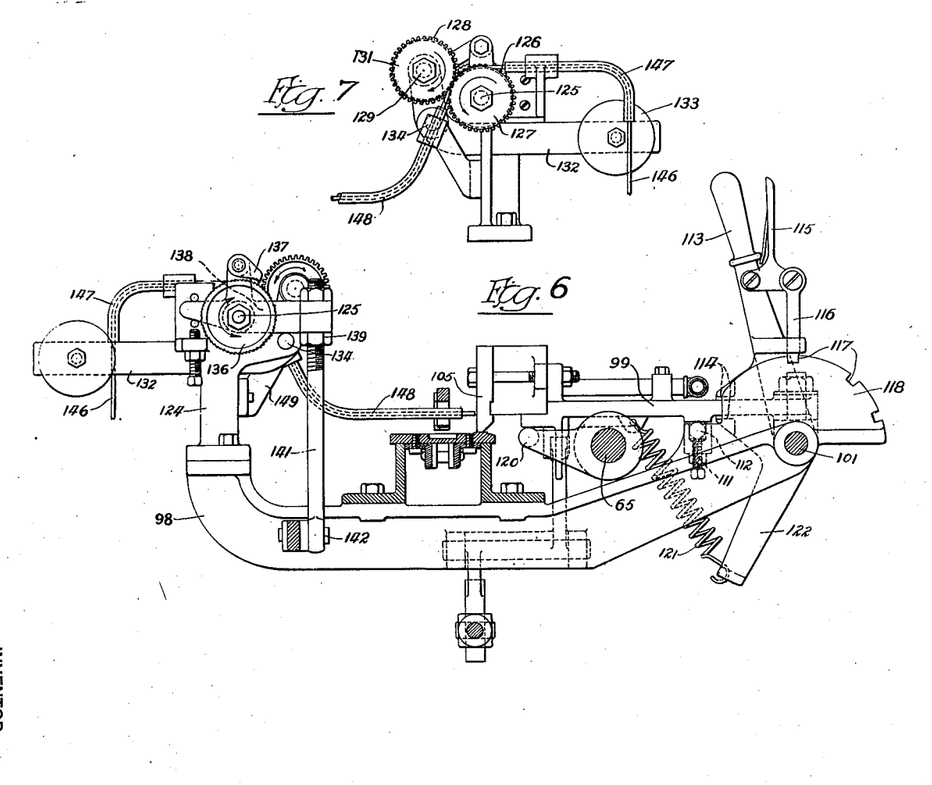
Fig. 6 is a sectional view taken substantially on the line 6—6 in Fig. 3.
Fig. 7 is a sectional view of a solder feeding mechanism from the side opposite that shown in Fig. 6.

Means are provided for regulating contact of the soldering iron 105 with the covers 52, as may be seen by reference to Fig. 6. A screw 111 backs against a ball 112 which is located in a socket in a suitable frame part as a bearing beneath the arm 99, and adjustment of this screw controls the contact position of the soldering iron 105. During movement of the conveyor 17, the soldering mechanism is raised to clearance position, indicated by dotted lines in Fig. 12, by a lifter arm 120 secured to and operated by the rocker shaft 65. The contact between the soldering iron 105 and the cover 52, or the arm 99 and the lifter arm 120, is maintained by a spring 121 connecting at one end to the arm 99 and at the other to a downwardly projecting arm 122 integral with a lever 113.

I have also provided manual means for lifting the solder mechanism completely away from its operative position, which may become necessary, in case a cover becomes jammed or to permit repairs or inspection of said mechanism. The hand lever 113 is fulcrumed onto the stud 101 and has side projections 114, which loosely embrace the solderng iron arm 99. A spring grip 115 is attached to this lever and has a latch pin 116 projecting downwardly therefrom and adapted to engage notches 117 in a quadrant 118 fixed on the frame bracket 98, the angle of the raised arm being regulated by engaging the latch pin 116 in the appropriate notch.

The mechanism whereby solder is supplied to the soldering iron 105 is supported upon the bracket 98 by a pedestal support 124, in which is mounted a shaft 125 carrying a gear 126 (Fig. 7) and a feed roll 127. The gear 126 meshes with a gear 128 mounted on a stud 129 and having secured thereto a feed roll 131. The stud 129 is secured in the end of a lever 132 which carries at the other end a weight 133 and is fulcrumed on a stud 134 secured in a lug 135, which is integral with the pedestal support 124. A ratchet 136 is fast on the shaft 125 at the end opposite the gear 126 and is actuated by a pawl 137 secured to and operated by a bell crank rocking lever 138. This lever is attached by an adjustable connection 139 to a connecting rod 141. This rod connects at 142 with a lever 143 (Fig. 1) which is operated to move the bell crank rocking lever 138 in one direction by a cam 144 in the cam member 80, and to move it in the other direction by a spring 145. The movement of the ratchet 136, thus accomplished, drives the gears 126 and 128 and operates the feed rolls 127 and 131. Wire solder 146 is fed to these rolls from a reel, not shown, through a guide tube 147 and the pressure thereon, between the feed rolls, is controlled by adjustment of the weight 133. Another guide tube 148, secured in a bracket 149, directs the solder wire to the face of the soldering iron 105 which melts and applies it.

Figure 8:
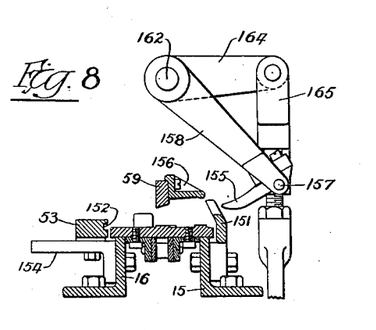
Fig. 8 is a sectional view taken substantially on the line 8—8 in Fig. 3.
Figure 13:
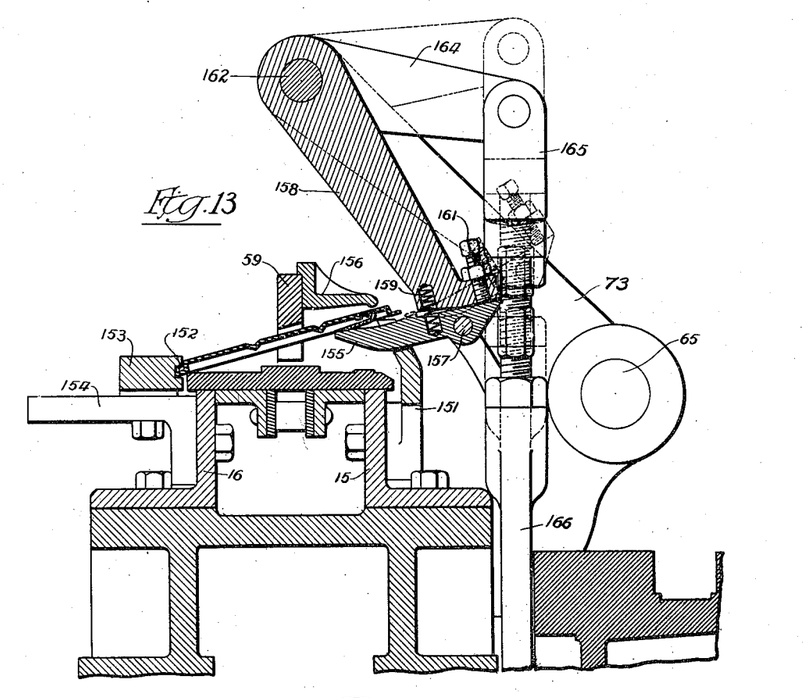
Fig. 13 is an enlarged sectional view showing the means whereby the lip is bent.
Figure 14:
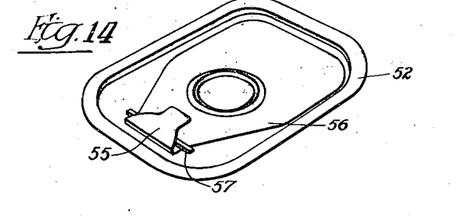
Fig. 14 is a perspective of a sardine can cover with the key lip soldered in place and bent to hooked position.

The final operation consists in folding the free end of the lip 55 to the hooked position shown in Fig. 14, and in this connection, attention is directed to Figs. 8 and 13. As the covers are moved along the conveyor 17 after the soldering operation, their lip ends are carried up an inclined guide 151 attached to the rail 15, the opposite ends being engaged in a groove 152 in a stop 153 secured to angle brackets 154 which are attached to the rail 16. The guide 59 is cut away sufficiently to permit the cover to rise upon the inclined guide 151 which, at its highest point, is cut to provide space for a folding finger 155. Above this point and attached to the guide 59 is a retaining bracket 156 which prevents movement or bending of the cover while the lip is being folded. The folding is accomplished by the finger 155, which is pivotally secured by a pin 157 to an operating lever 158, and is held by a spring 159 against a stop screw 161. The lever 158 is fulcrumed on a stud 162 mounted in the bracket 73 and is connected by a link 164 and an adjustable connection 165 with a forked member 166 which straddles the shaft 32 and carries a cam roll, which rides in a face cam groove in the cam member 80, thus giving intermittent movement to the folding finger 155. After completion of this operation, the covers are moved down the inclined guide 151 and are passed by the conveyor 17 to a point, where they are dropped off the delivery end of the machine, either to a stack or a conveyor, as desired.

It is evident that the machine as described has the distinct advantage of greatly increasing the output of covers per operator, as well as producing a neat package with key lip accurately positioned.

It is thought that the invention and many of its attendant advantages will be understood from the foregoing description, and it will be apparent that various changes may be made in the form, construction and arrangement of the parts without departing from the spirit and scope of the invention or sacrificing its material advantages, the form hereinbefore described being merely a preferred embodiment thereof.

I claim:

1. A machine for applying solder to metal articles, comprising a longitudinal guide and an endless link conveyer for moving said articles into position to be operated upon, and automatic means at stations along said guide for feeding and applying solder and shaping articles as desired actuated in connection with the movement of the said conveyor.

2. A machine for soldering metal articles having parts which require to be positioned relative to each other, comprising a frame, a conveyor moved thereon, and a mechanism for accurately positioning the parts of said articles and means for thereafter applying solder thereto and article bending and uniting means operating in connection with the movement of said conveyor.

3. A soldering machine comprising means for feeding articles to be operated upon, means for accurately assembling the parts of said articles to be soldered, and a mechanism for applying properly proportioned quantities of flux and solder and for shaping and delivering said articles as desired.

4. A soldering machine comprising an intermittently moving conveyor bringing articles successively into position to have solder applied thereto, and intermittently acting means for accurately positioning the parts of said articles to be soldered together, for applying predetermined amounts of solder, and for shaping and delivering said articles as desired.

5. A machine for soldering key lips to covers for sardine cans and the like, said machine comprising a conveyor for moving approximately assembled covers and lips into position to be operated upon, means for accurately positioning and shaping said parts to be soldered, means for applying properly proportioned quantities of flux and solder to the joint between said parts, and means for bending said lips to the position desired and for delivering the assembled articles from the machine.

6. In a machine for soldering key lips to covers for sardine cans and the like, an assembling mechanism comprising a lever, a contact plate movably secured thereon, and adapted to move said lips to accurate position to be soldered, and a rocker shaft intermittently actuating said lever.

7. In a machine for soldering key lips to covers for sardine cans and the like, an assembling mechanism comprising a lever, a contact plate movably secured thereon, and adapted to move said lips to accurate position to be soldered, a rocker shaft intermittently actuating said lever, and an intermittently acting hammer for flattening said covers and lips together.

8. In a machine for soldering key lips to covers for sardine cans and the like, a mechanism for feeding flux in measured quantities to the surface to which solder is to be applied, said mechanism comprising an elevated drip cup and tube through which said flux is fed, a funnel receiving the flux, absorbent material in said funnel adapted to be pressed against and to deposit flux on the surface to be soldered, and an intermittently operated rocker arm to which said funnel is adjustably secured.

9. In a machine for soldering key lips to covers for sardine cans and the like, a mechanism for applying solder to said articles, said mechanism comprising a combustion chamber, a soldering iron forming one side of said chamber, means for measurably feeding solder endwise to said iron against the side thereof, and automatic means for intermittently bringing said iron into contacting position and for oscillating it while such contact is maintained.

10. In a machine for soldering lips to can ends, the combination of means for conveying said can ends intermittently, mechanism operating on said can ends and lips, and comprising a positioning device which positions the lip accurately on the cover, a hammer for tightly uniting the lip with the cover, means applying flux to the lip and cover, soldering devices for soldering the lip to the cover, means for bending the end of the lip after said soldering, driving mechanism for the above elements, and automatic means for disconnecting said conveying means from the driving mechanism when a cover on the conveying means obstructs the movement of the same.

11. In a machine for soldering key lips to covers for sardine cans and the like, the combination of soldering mechanism, and subsequently operating means for bending the outer free ends of the soldered lips to desired position, said means comprising guiding members directing the covers to an operating position, and intermittently acting operating members comprising an adjustable folder finger, a lever to which said finger is secured, and arm and rocker members actuating said lever and finger to hold the lips.

12. In a machine for soldering lips to can ends, the combination of means for conveying said can ends intermittently, mechanism operating on said can ends and lips, and comprising a positioning device which positions the lip accurately on the cover, a hammer for tightly uniting the lip with the cover, means applying flux to the lip and cover, soldering devices for soldering the lip to the cover, means for bending the end of the lip after said soldering, and driving mechanism for the above elements.

13. In a soldering machine, a solder applying member normally held in operative position, and manual means for lifting said member from its support or work to permit repairs or inspection, said means comprising an arm upon which said member is carried, a hand lever adapted to operate said arm, a spring grip on said lever, a latch pin secured to said spring grip, and a quadrant adapted to engage said latch pin to hold said solder applying member at a desired angle.

14. A machine for soldering key lips to covers for sardine cans and the like, comprising, in combination, means for accurately assembling said covers and lips preparatory to soldering, means for measurably feeding flux and solder for use upon said assembled articles, means for applying solder thereto, and means for bending said lips to desired position, all said means being automatic and intermittent in action.

15. In a machine for soldering lips to can ends, the combination of a link conveyer for conveying said can ends intermittently, mechanism operating on said can ends and lips, and comprising a positioning device which positions the lip accurately on the cover, a hammer for tightly uniting the lip with the cover, means applying flux to the lip and cover soldering devices for soldering the lip to the cover, means for bending the end of the lip after said soldering, driving mechanism for the above elements, and automatic means for disconnecting said conveyer from the driving mechanism when a cover on the conveying means obstructs the movement of the same.

16. In a machine for soldering key lips to covers for sardine cans and the like, the combination of means for soldering said lips in place and means for bending them to desired permanent configuration adapted to permit ready engagement by a key for opening.

GEORGE A. LEIGHTON.